United States Patent
Funabashi

(10) Patent No.: US 6,243,524 B1
(45) Date of Patent: Jun. 5, 2001

(54) OPTICAL WAVEGUIDE, METHOD FOR FABRICATING SAME, AND COUPLING STRUCTURE OF OPTICAL WAVEGUIDE TO LIGHT-RECEIVING DEVICE

(75) Inventor: Masaaki Funabashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/220,359

(22) Filed: Dec. 24, 1998

(30) Foreign Application Priority Data

Dec. 26, 1997 (JP) .................................................. 9-361105

(51) Int. Cl.$^7$ ....................................................... G02B 6/10
(52) U.S. Cl. ........................... 385/129; 385/132; 385/143; 385/31
(58) Field of Search ................................ 385/3–8, 14–16, 385/27–30, 129, 130, 131, 146, 132, 147, 141, 143, 144, 123, 31, 49, 50; 250/227.11; 156/245

(56) References Cited

U.S. PATENT DOCUMENTS

| | | | |
|---|---|---|---|
| 4,846,548 | * | 7/1989 | Klainer .................................. 385/129 |
| 5,170,448 | * | 12/1992 | Acklet et al. ........................... 385/31 |
| 5,210,801 | * | 5/1993 | Fournier et al. ...................... 385/129 |
| 5,265,184 | * | 11/1993 | Lebby et al. .......................... 385/132 |
| 5,511,142 | * | 4/1996 | Horie et al. ........................... 385/129 |
| 5,513,288 | * | 4/1996 | Mayer .................................... 385/30 |
| 5,644,667 | * | 7/1997 | Tabuchi ................................. 385/131 |
| 5,729,641 | * | 3/1998 | Chandonnet et al. .................... 385/2 |
| 5,937,128 | * | 8/1999 | Robertsson ............................ 385/129 |
| 6,047,098 | * | 4/2000 | Sagawa et al. ....................... 385/141 |
| 6,069,988 | * | 5/2000 | Kokura et al. .......................... 385/37 |

FOREIGN PATENT DOCUMENTS

| | | | |
|---|---|---|---|
| 01133007 | * | 5/1989 | (JP) ...................................... 385/146 |
| 4-140702 | | 5/1992 | (JP) . |
| 5-264870 | | 10/1993 | (JP) . |

OTHER PUBLICATIONS

Japanese Office Action, dated Jul. 27, 1999, with English Language Translation of Japanese Examiner's comments.

* cited by examiner

*Primary Examiner*—Frank G. Font
*Assistant Examiner*—Sang H. Nguyen
(74) *Attorney, Agent, or Firm*—McGuireWoods LLP

(57) ABSTRACT

An optical waveguide composed of a core section, and a cladding section disposed so as to enclose the core section, wherein a cavity the inner surface of which inclines with respect to the core section of the optical waveguide is defined on one of principal planes parallel to the core section so as to traverse partly or perfectly a section of the core, and the cavity is filled with a material having a higher index of refraction than that of the core section. Whereby an optical waveguide which can be downsized and is excellent in productivity, a method for fabricating the same, and a coupling structure of the optical waveguide to a light-receiving device are provided.

17 Claims, 3 Drawing Sheets

OPTICAL WAVEGUIDE, METHOD FOR FABRICATING SAME, AND COUPLING STRUCTURE OF OPTICAL WAVEGUIDE TO LIGHT-RECEIVING DEVICE

FIELD OF THE INVENTION

The present invention relates to an optical waveguide, a method for fabricating the same, and a coupling structure of the optical waveguide to a light-receiving device.

BACKGROUND OF THE INVENTION

Heretofore, as an example for a coupling structure of an optical waveguide to a light-receiving device, the one shown in FIG. 1 is usual.

In the coupling structure, an optical waveguide 4 made of a quartz-base material and having a structure wherein a long core 2 having a high index of refraction and a square or rectangular section is enclosed with a cladding 3 having a low index of refraction is formed on a base 1 made of a silicon substrate or the like, an end plane 2a of the core 2 is opposed to a light-receiving plane 6 of a photodiode (PD: light-receiving device) 5, the end plane 2a of the core 2 is positioned in such that the center thereof coincides substantially with the center of the light-receiving plane 6 of the photodiode 5, and then, the photodiode 5 is fixed to on the base 1.

Since it is required to position the center of the end plane 2a of the core 2 in such that the former center coincides substantially with the center of the light-receiving plane 6 of the photodiode 5 in the above described structure, there is such a manner that markers (register marks) indicating positions of the optical waveguide 4 and the photodiode 5, respectively, have been previously prepared on the base 1, and the optical waveguide 4 and the photodiode 5 are fixed after having been in register, respectively, in the case where the optical waveguide 4 and the photodiode 5 are fixed on the base 1.

Meanwhile, since it is required to fix the optical waveguide 4 and the photodiode 5 on the base 1 made of a silicon substrate and the like in the above-mentioned conventional coupling structure of optical waveguide to light-receiving device, there have been a problem of requiring an extra material of the base 1, so that it is difficult to downsize the whole structure, and another problem of a difficulty to lower costs for the structure, because the base 1 must be used in the structure so that it becomes expensive.

Furthermore, such a manner that markers for indicating positions of the optical waveguide 4 and the photodiode 5 have been previously formed on the base 1, respectively, and then, the optical waveguide 4 and the photodiode 5 are fixed so as to maintain register in the respective markers is applied in the above described structure. In this case, however, variations in positions of the respective markers formed on the base 1 are significant, and further variations in positioning of the optical waveguide 4 and the photodiode 5 in case of securing them on the markers thus formed are also remarkable. As a result, there is a problem of magnifying further relative positional displacements in the core 2 of the optical waveguide 4 with respect to the light-receiving plane 6 of the photodiode 5, resulting in defective products due to the positional discrepancies, in turn, it becomes a cause for reducing an yield of products.

SUMMARY OF THE INVENTION

Accordingly, it is an object of the present invention to provide an optical waveguide which can be downsized and is excellent in productivity, a method for fabricating the same, and a coupling structure of the optical waveguide to a light-receiving device.

According to the first feature of the invention, an optical waveguide composed of a core part and a cladding part disposed so as to enclose the core part, comprises a cavity having an inner surface which inclines relative to a light axis of the core section, the cavity crossing partly or perfectly the core section; and a material for filling the cavity, the material having a refractive index higher than the core section.

In the preferred embodiment, the cavity is any one of conical, pyramidal, and wedge-shaped cavities in the above described optical waveguide.

In the preferred embodiment, the material is a resin in the above described optical waveguide.

In the preferred embodiment, the resin is an ultraviolet-curing resin in the above described optical waveguide.

According to the second feature of the invention, a method for fabricating an optical waveguide composed of a core section, and a cladding section disposed so as to enclose the core section, comprises the steps of:

defining a cavity the inner surface of which inclines with respect to the core section of the optical waveguide on one of principal planes parallel to the core section so as to traverse partly or perfectly a section of the core; and filling the cavity with a material having a higher index of refraction than that of the core section.

According to the third feature of the invention, a coupling structure of the optical waveguide to a light-receiving device, comprises a light-receiving plane of the light-receiving device being disposed to face a cavity of the optical waveguide composed of a core section, and a cladding section disposed so as to enclose the core section, wherein the cavity the inner surface of which inclines with respect to the core section of the optical waveguide is defined on one of principal planes parallel to the core section so as to traverse partly or perfectly a section of the core, and the cavity is filled with a material having a higher index of refraction than that of the core section; and the light-receiving device being fixed to the optical waveguide.

In a preferred embodiment, a coupling structure of the optical waveguide to a light-receiving device in the above described coupling structure, wherein register markers for positioning the optical waveguide and the light-receiving device are prepared respectively, and the markers for the optical waveguide and the markers for the light-receiving device are allowed to be in register, thereby to position the light-receiving device with respect to the optical waveguide.

In the optical waveguide according to the invention, a cavity the inner surface of which inclines with respect to the core section of the optical waveguide is defined on one of principal planes parallel to the core section so as to traverse partly or perfectly a section of the core; and the cavity is filled with a material having a higher index of refraction than that of the core section.

If the cavity is not filled with a material having a higher index of refraction than that of the core section, a refraction factor of the core section becomes higher than that (about 1.00) of air, so that a part of the light propagating through the core section is reflected by the interface between the core section and the cavity, and the light other than that reflected proceeds towards the direction of the cavity peak while being refracted in accordance with Snell laws of refraction. Accordingly, the light is difficult to be output outside the cavity.

On the other hand, when the cavity is filled with a material having a higher index of refraction than that of the core section, the light propagating through the core section enters into the cavity without being reflected by the interface between the core section and the cavity, and proceeds to the direction opposite to the cavity peak while being refracted. Thereafter, the light is reflected by the inner surface of the cavity, and is output towards the outside of the cavity.

Thus, it becomes possible to lift the light propagating through the core section along the direction perpendicular substantially to the core section.

BRIEF DESCRIPTION OF THE DRAWINGS

The present invention will be explained in more detail in conjunction with appended drawings, wherein.

DESCRIPTION OF THE PREFERRED EMBODIMENTS

Each embodiment of the optical waveguide, the method for fabricating the same, and the coupling structure of optical waveguide to light-receiving device according to the present invention will be described by referring to the accompanying drawings.

Figure 1:
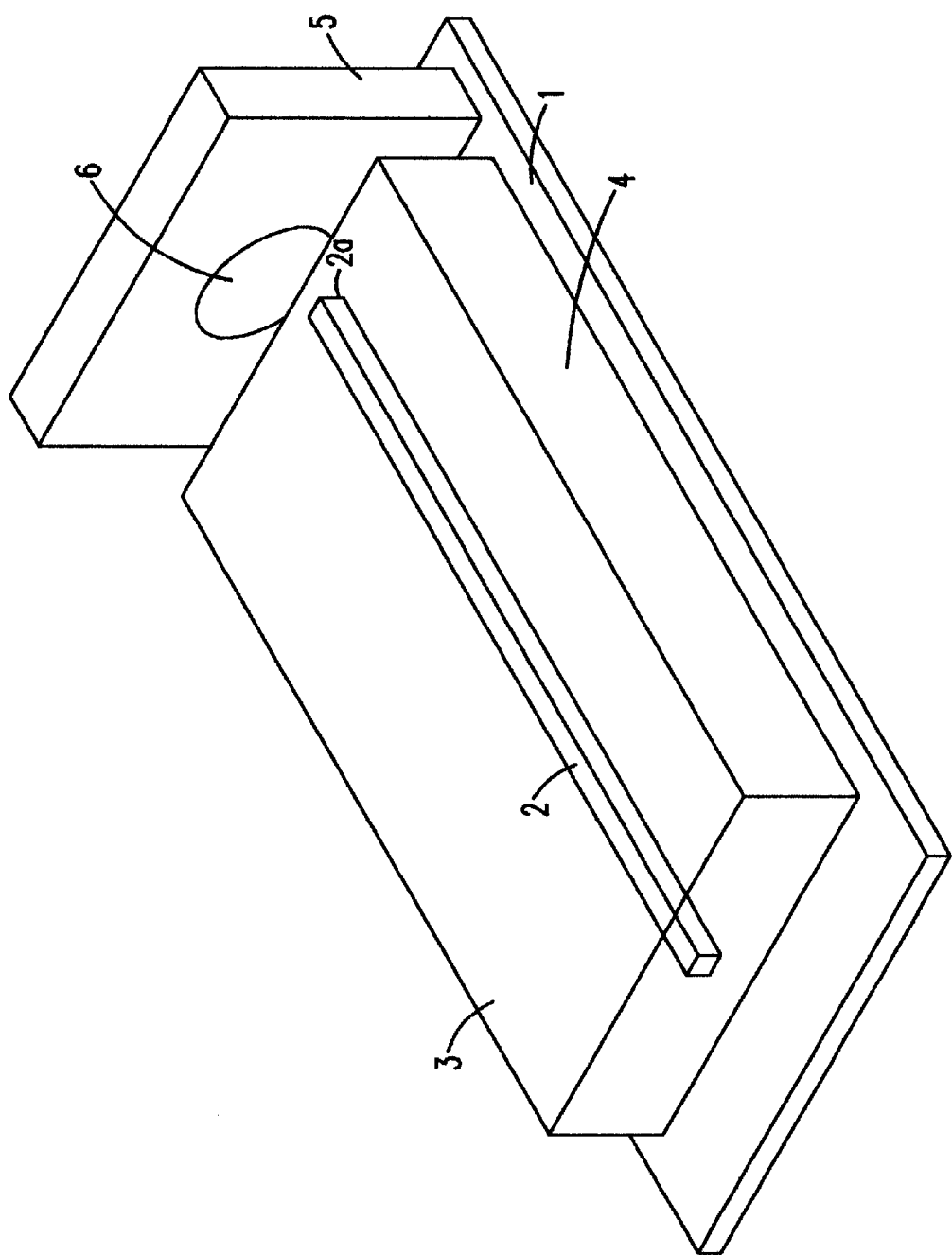
FIG. 1 is a perspective view showing a conventional coupling structure of an optical waveguide to a light-receiving device.
Figure 2:
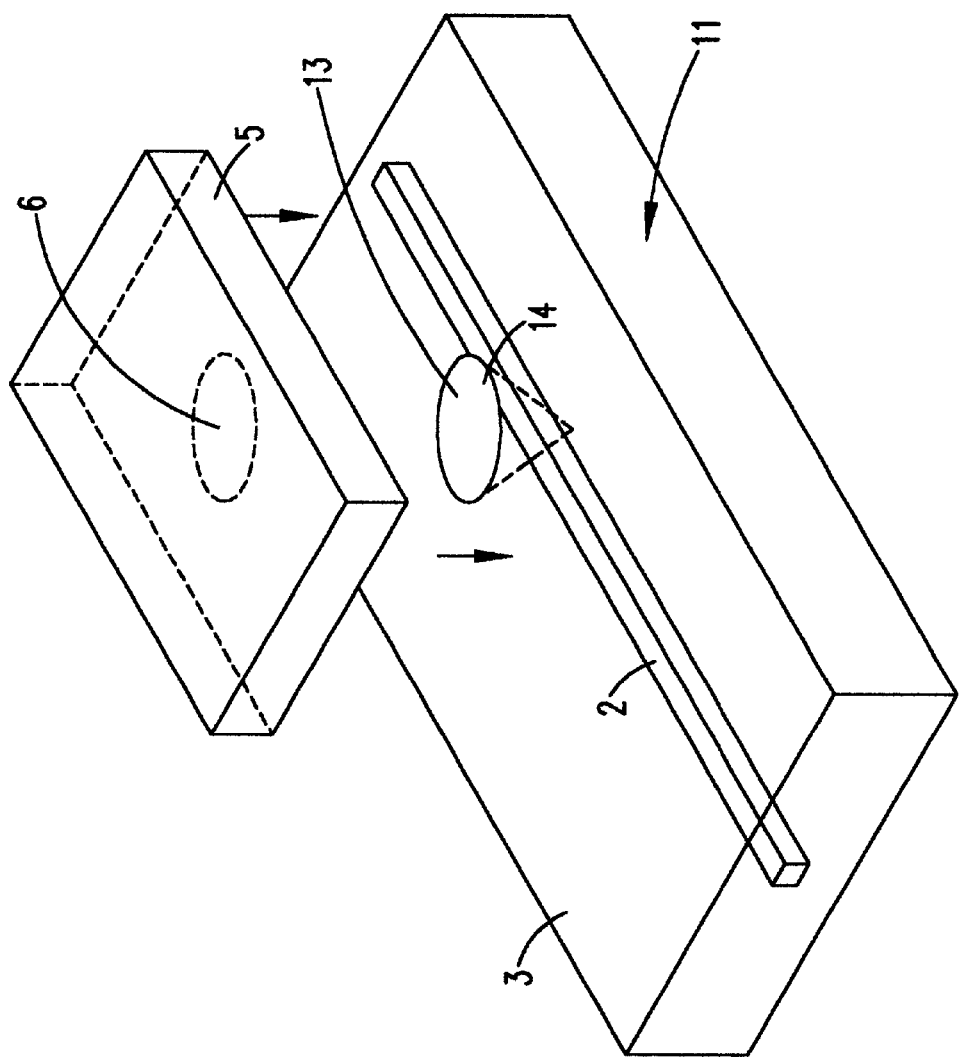
FIG. 2 is an exploded perspective view showing an embodiment of the coupling structure of an optical waveguide to a light-receiving device according to the invention.
Figure 3:
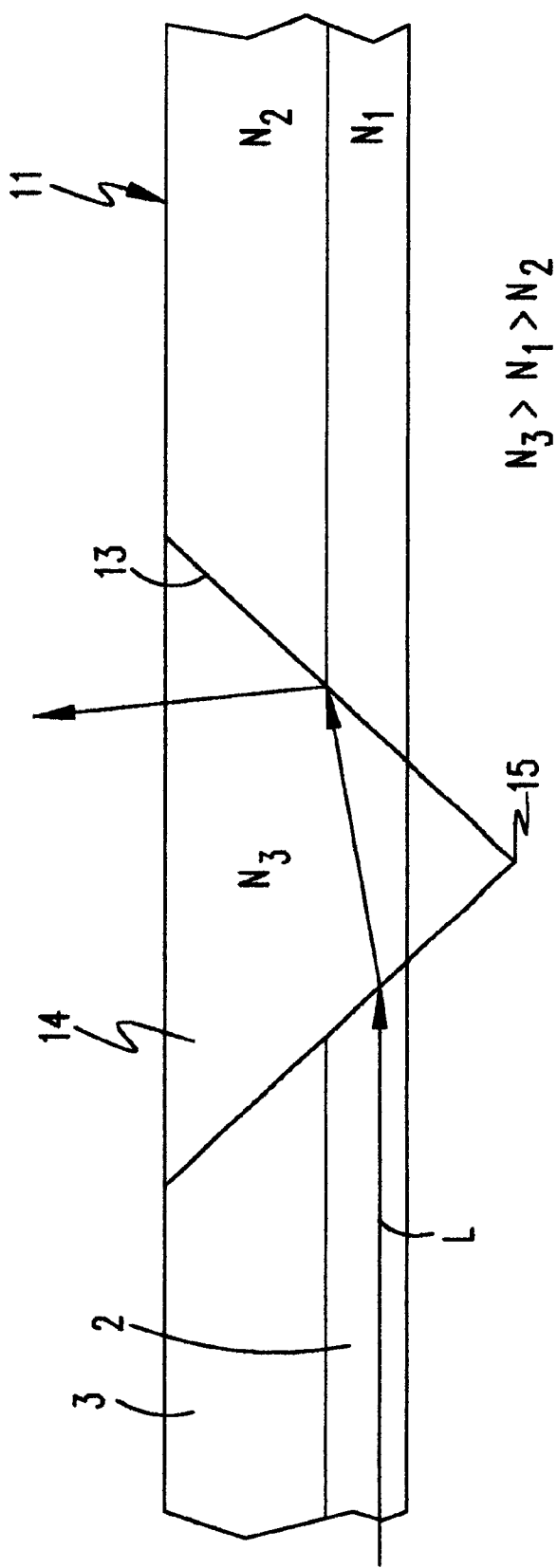
FIG. 3 is a sectional view showing an essential part of an embodiment of the optical waveguide according to the invention.

FIG. 2 is an exploded perspective view showing an embodiment of the coupling structure of optical waveguide to light-receiving device according to the invention, and FIG. 3 is a sectional view showing an essential part of the optical waveguide of FIG. 2.

In these figures, an optical waveguide 11 is composed of a core 2 and a cladding 3 each made of quartz-base glass, and a film of the quartz-base glass is formed on a substrate 12 in accordance with chemical vapor deposition (CVD) method and the like.

A difference in specific refraction factors of the core 2 and the cladding 3 as well as a width and a height of the core 2 are adjusted in such that the resulting optical waveguide operates in single-mode manner within a region of a wavelength of 1.3 mm or more. For example, a section of the core 2 is a square of 6 mm height and 6 mm width, and on the other hand, a difference in specific refraction factors of the core 2 and the cladding 3 is 0.3%. Further, although preferable is silicon substrate as the above described substrate 12, quartz, ceramic and the like substrates may be also used.

A conic-shaped cavity 13 is defined on the top plane (one of principal planes parallel to the core 2) of the optical waveguide 11 so as to traverse the whole section of the core 2, and the cavity 13 is filled with a resin 14 having a higher index of refraction than that of the core 2. As to the resin 14, it is required to be transparent in wavelength zone at 1.3 mm and 1.55 mm, so that an adhesive or a potting agent may be used, and particularly, an ultraviolet-curing adhesive having an index of refraction of 1.5 is preferably used.

A light-receiving plane 6 of the photodiode 5 is opposed to the cavity 13, and the photodiode 5 is fixed to the optical waveguide 11 by means of an adhesive or the like.

In the resulting coupling structure, it is possible to optically and efficiently couple the photodiode 5 to the optical waveguide 11.

As shown in FIG. 3, a relationship:

$$n3 > n1 > n2$$

exists among a refraction factor n1 of the core 2, a refraction factor n2 of the cladding 3, and a refraction factor n3 of the resin 14.

Light L propagating through the core 2 enters into the cavity 13 without reflecting on the interface between the core 2 and the cavity 13, and proceeds towards the direction opposite to a peak 15 of the cavity 13 while being refracted therein. Then, the light L is reflected by the inner surface of the cavity 13, and is output towards the direction outside the cavity 13. Thus, the light L propagating through the core 2 can be allowed to ascend in the direction perpendicular to the core 2.

In the following, a method for fabricating the optical waveguide 11 will be described.

First, a film made of quartz-base glass which will compose the core 2 and the cladding 3 is formed on a substrate 12 made of silicon or the like in accordance with TEOS (tetraethoxysilane: Si(OC2H5)4)-CVD method. A film thickness of the resulting quartz glass is 30 mm. Furthermore, flame deposition method, electron beam deposition, sputtering method and the like may be also applied as a method for forming a film.

Then, a grindstone having a conical shape is rotated and pushed against the core 2 and the cladding 3 from the direction perpendicular thereto, and the peak of the conical grindstone is allowed to proceed little by little towards the core 2, and such cutting operation continues until the extreme end of the conical grindstone cuts off perfectly the core 2 to define the conical cavity 13 on the core 2. Alternatively, it is possible to define the cavity 13 by means of etching or the like manner in place of the cutting operation.

Thereafter, the cavity 13 is filled with a resin 14. For example, when the cavity 13 is filled with an ultraviolet-curing adhesive having an index of refraction of 1.5, the resin is cured by radiating ultraviolet rays thereon.

In case of coupling the photodiode 5 to the optical waveguide 11, the light-receiving plane 6 of the photodiode 5 is opposed to the cavity 13 of the optical waveguide 11, and the photodiode 5 is adhesively secured to the optical waveguide 11. In this case, register markers (marks) have been previously formed on the optical waveguide 11 and the photodiode 5, respectively, and when these markers are in register with each other, positioning for the optical waveguide 11 and the photodiode 5 becomes easy, besides an accuracy of the positioning for these parts elevates also. As a result, a yield of the products is improved, so that reduction in the costs becomes possible.

As described above, the light L propagating through the core 2 of the optical waveguide 11 can be allowed to ascend along the direction substantially perpendicular to a plane of the optical waveguide 11 in the present embodiment.

Moreover, the photodiode 5 may be fixed directly to the optical waveguide 11 before receiving the light output from the optical waveguide 11 by the photodiode 5, whereby positioning for the photodiode 5 becomes easy.

In the present embodiment, although the conical cavity 13 has been defined on the top surface of the optical waveguide 11 so as to traverse perfectly a section of the core 2, a profile of the cavity may be any shape such as polyangular pyramid, e.g., quadrangular pyramid and the like, and wedge shape in addition to a conical shape so far as the cavity 13 can lift the light propagating through the core 2 along the direction substantially perpendicular thereto.

While the cavity 13 has been defined so as to traverse perfectly a section of the core 2, the cavity may be defined so as to traverse partly a section of the core 2.

Although no shape and no number of register markers for suitably positioning the photodiode 5 with respect to the optical waveguide 11 have been shown, respectively, in the present embodiment, it is possible to suitably design such register markers in conformity with each profile of the optical waveguide 11 and the photodiode 5.

AS is understood from the above description, in the optical waveguide of the present invention, a cavity the inner surface of which inclines with respect to a core section of the optical waveguide is defined on one of principal planes parallel to the core section so as to traverse partly or perfectly a section of the core, and the cavity is filled with a material having a higher index of refraction than that of the core section. Accordingly, the light propagating through the core section can be allowed to ascend in the direction substantially perpendicular to the core section.

Since a method for fabricating an optical waveguide according to the present invention comprises the steps of defining a cavity the inner surface of which inclines with respect to a core section of the optical waveguide on one of principal planes parallel to the core section so as to traverse partly or perfectly a section of the core, and charging the cavity with a material having a higher index of refraction than that of the core section, the optical waveguide by which the light propagating through the core section can be allowed to ascend in the direction perpendicular substantially to the core section may be easily fabricated.

According to the coupling structure of the optical waveguide to a light-receiving device of the present invention, the light-receiving plane of a light-receiving device is disposed to face a cavity of the optical waveguide claimed in claim 1, 2, 3 or 4, and the light-receiving device is fixed to the optical waveguide. As a result, an area occupied by the coupling structure becomes substantially the same as that occupied by the optical waveguide so that it becomes possible to downsize the coupling structure. In addition, since the light-receiving device can be directly fixed to the optical waveguide, positioning of the light-receiving device becomes easy, resulting in elevation of yields, and in turn, it can be intended to reduce costs therefor.

It will be appreciated by those of ordinary skill in the art that the present invention can be embodied in other specific forms without departing from the spirit or essential characteristics thereof.

The presently disclosed embodiments are therefore considered in all respects to be illustrative and not restrictive. The scope of the invention is indicated by the appended claims rather than the foregoing description, and all changes that come within the meaning and range of equivalents thereof are intended to be embraced therein.

What is claimed is:

1. An optical waveguide composed of a core section, and a cladding section disposed so as to enclose said core section, comprising:
    a cavity having an inner surface which inclines relative to a light axis of said core section, said cavity crossing one of a partial section and a whole section of said core section; and
    a material completely filling said cavity, said material having a refractive index higher than said core section.

2. The optical waveguide as claimed in claim 1, wherein said cavity is any one of conical, pyramidal, and wedge-shaped cavities.

3. The optical waveguide as claimed in claim 1, wherein said material is a resin.

4. The optical waveguide as claimed in claim 3, wherein said resin is an ultraviolet-curing resin.

5. The optical waveguide as claimed in claim 1, wherein said core section and said cladding section are made of quartz-base glass having different refraction factors.

6. The optical waveguide as claimed in claim 5, wherein said different refraction factors are adjusted such that a resulting optical waveguide operates in a single-mode manner within a region of a wavelength of at least 1.3 mm.

7. The optical waveguide as claimed in claim 5, wherein said different refraction factors is 0.3%.

8. The optical waveguide as claimed in claim 1, wherein said material is a transparent resin having a transparency in a wavelength zone at 1.3 mm and 1.55 mm.

9. The optical waveguide as claimed in claim 1, wherein said core section has a refraction factor n1, said cladding section has a refraction factor n2 and said material has a refraction factor n3, wherein n3>n1>n2.

10. The optical waveguide as claimed in claim 1, further comprising an interface between said cavity and said core section, said interface permits light propagating through said core section to enter into said cavity without reflecting on said interface.

11. The optical waveguide as claimed in claim 1, wherein said cavity crosses a section of said cladding section.

12. A method for fabricating an optical waveguide composed of a core section, and a cladding section disposed so as to enclose said core section comprising the steps of:
    defining a cavity having an inner surface of which inclines with respect to said core section of said optical waveguide on one of principal planes parallel to said core section so as to traverse one of a partial section and a whole section of said core section; and
    filling completely said cavity with a material having a higher index of refraction than that of said core section.

13. The method for fabricating an optical waveguide as claimed in claim 12, wherein defining said cavity includes etching.

14. The method for fabricating an optical waveguide as claimed in claim 12, wherein said filling step includes filling said cavity with resin.

15. The method of fabricating an optical waveguide as claimed in claim 13, wherein said resin is cured by radiating ultraviolet rays thereon.

16. A coupling structure of the optical waveguide to a light-receiving device, comprising:
    a light-receiving plane of said light-receiving device being disposed to face a cavity of said optical waveguide composed of a core section, and a cladding section disposed so as to enclose said core section, wherein said cavity has an inner surface of which inclines with respect to said core section of said optical waveguide and is defined on one of principal planes parallel to said core section so as to traverse a one of partial section and a whole section of said core section, and said cavity is completely filled with a material having a higher index of refraction than that of said core section; and
    said light-receiving device being fixed to said optical waveguide.

17. The coupling structure of the optical waveguide to a light-receiving device as claimed in claim 16, wherein register markers for positioning said optical waveguide and said light-receiving device are prepared respectively, and the markers for said optical waveguide and the markers for said light-receiving device are allowed to be in register, thereby to position said light-receiving device with respect to said optical waveguide.

* * * * *